US011970888B2

(12) United States Patent
Wahmann

(10) Patent No.: US 11,970,888 B2
(45) Date of Patent: Apr. 30, 2024

(54) MOTOR VEHICLE LOCK

(71) Applicant: Kiekert AG, Heiligenhaus (DE)

(72) Inventor: Hendrik Wahmann, Düsseldorf (DE)

(73) Assignee: Kiekert AG, Heiligenhaus (DE)

( * ) Notice: Subject to any disclaimer, the term of this patent is extended or adjusted under 35 U.S.C. 154(b) by 181 days.

(21) Appl. No.: 17/436,099

(22) PCT Filed: Jan. 24, 2020

(86) PCT No.: PCT/DE2020/100044
§ 371 (c)(1),
(2) Date: Sep. 3, 2021

(87) PCT Pub. No.: WO2020/177801
PCT Pub. Date: Sep. 10, 2020

(65) Prior Publication Data

US 2022/0186534 A1 Jun. 16, 2022

(30) Foreign Application Priority Data

Mar. 6, 2019 (DE) ..................... 10 2019 105 631.4

(51) Int. Cl.
*E05B 85/26* (2014.01)
*E05B 81/14* (2014.01)
*E05B 85/24* (2014.01)

(52) U.S. Cl.
CPC .............. *E05B 85/26* (2013.01); *E05B 81/14* (2013.01); *E05B 85/243* (2013.01)

(58) Field of Classification Search
CPC ........ E05B 85/20; E05B 85/24; E05B 85/243; E05B 85/26; E05B 81/14
See application file for complete search history.

(56) References Cited

U.S. PATENT DOCUMENTS 5,092,639 A * 3/1992 Di Giusto ............... E05B 85/26 292/216
5,188,406 A * 2/1993 Sterzenbach ........... E05B 85/26 292/216

(Continued)

FOREIGN PATENT DOCUMENTS

DE 4102049 A1 7/1992
DE 19650826 A1 * 6/1998 ............. E05B 81/14

(Continued)

OTHER PUBLICATIONS

Computer Generated Translation for EP 2492423 A2, Generated on May 9, 2023, https://worldwide.espacenet.com/ (Year: 2023).*

(Continued)

*Primary Examiner* — Alyson M Merlino
(74) *Attorney, Agent, or Firm* — Renner, Otto, Boisselle & Sklar, LLP

(57) ABSTRACT

A motor vehicle lock, in particular a motor vehicle door lock, which is equipped with a locking mechanism consisting of a rotary latch and at least one pawl. An actuating lever mounted in a lock case for rotation about an axis is also provided. The pawl is mounted on the actuating lever for rotation about an axis. According to the invention, the rotary latch applies a closing moment on the pawl when the locking mechanism is in the closed state, which moment transitions into an opening moment on the pawl when the locking mechanism is opened as a result of the associated movement of the actuating lever and the shifting of the axis for the pawl.

12 Claims, 6 Drawing Sheets

(56) References Cited

U.S. PATENT DOCUMENTS

| | | | | |
|---|---|---|---|---|
| 6,485,071 | B2 * | 11/2002 | Schwaiger | E05B 83/16<br>292/216 |
| 11,512,510 | B2 * | 11/2022 | Ottino | E05B 85/26 |
| 2016/0215536 | A1 * | 7/2016 | Cumbo | E05B 85/243 |
| 2017/0122012 | A1 | 5/2017 | Nam | |
| 2021/0180372 | A1 * | 6/2021 | Ishiguro | E05B 85/26 |

FOREIGN PATENT DOCUMENTS

| | | | | |
|---|---|---|---|---|
| DE | 102009029023 | A1 * | 3/2011 | E05B 85/26 |
| DE | 102009029023 | A1 | 3/2011 | |
| DE | 10214691 | B4 | 9/2013 | |
| DE | 102014006118 | A1 | 10/2015 | |
| DE | 112014004516 | T5 | 9/2016 | |
| EP | 0406777 | A1 | 1/1991 | |
| EP | 2492423 | A2 * | 8/2012 | E05B 85/26 |
| FR | 2782109 | A1 | 2/2000 | |
| GB | 2433768 | A * | 7/2007 | E05B 85/26 |
| WO | 2015044463 | A1 | 4/2015 | |

OTHER PUBLICATIONS

International Search Report issued May 20, 2020, for International Patent Application No. PCT/DE2020/100044.

* cited by examiner

MOTOR VEHICLE LOCK

This application is a national phase of International Application No. PCT/DE2020/100044 filed Jan. 24, 2020, which claims priority to Germany Application No. 10 2019 105 631.4 filed Mar. 6, 2019, the entire disclosures of which are hereby incorporated by reference.

FIELD OF DISCLOSURE

The invention relates to a motor vehicle lock, in particular a motor vehicle door lock, having a locking mechanism consisting of at least one rotary latch and at least one pawl, and having an actuating lever mounted for rotation about an axis, wherein the pawl is mounted on the actuating lever for rotation about an axis.

BACKGROUND OF DISCLOSURE

The aforementioned motor vehicle lock can be, for example, a motor vehicle door lock. In principle, the term motor vehicle lock also includes tailgate locks, front hood locks, tank flap locks, and loading flap locks, to name just a few examples. The locking mechanism used at this point essentially has a rotary latch and a pawl. In principle, however, multi-pawl locking mechanisms can also be used in which a rotary latch with two or more pawls is used, as is described by way of example in the prior art according to DE 10 2009 029 023 A1.

In the above teaching according to DE 10 2009 029 023 A1, an opening moment is applied on the pawl in the main ratchet position of the locking mechanism. The pawl comprises a carrier pawl mounted for rotation and a locking pawl connected thereto via a hinge. In this way, the known motor vehicle lock can be opened with little effort. However, the opening moment applied on the pawl in the main ratchet position of the locking mechanism can, under certain circumstances, lead to problems such that the pawl opens unintentionally, e.g. while a motor vehicle is in motion. This process is also known as a "pawl walkout."

In the generic prior art according to DE 102 14 691 B4, the overall aim is to release the pawl from the rotary latch with the aid of low actuating forces. For this purpose, the pawl is pivotably mounted on an actuating lever. In the locking position, the rotary latch rests against a stop surface of the pawl thanks to a spring. In addition, the pawl rests against the rotary latch at a further point or rocking point, wherein the rocking point is between a point of application and the abovementioned stop surface. The actuating lever engages the point of application on the pawl to release the rotary latch.

The known teaching according to DE 102 14 691 B4 has the fundamental disadvantage that the spring acts in a locking position between the rotary latch and the lock case and thereby comes into contact with its latching stop on the stop surface of the pawl. An additional spring is also provided, which spring acts between the rotary latch and the pawl and pulls the pawl against the rotary latch.

The use of several springs in the locking mechanism is in need of improvement in several respects. Firstly, springs are relatively expensive, so that the motor vehicle lock designed accordingly has competitive disadvantages. In addition, such springs can decrease in their effectiveness in practical and, in particular, multi-year operation, as a result of which functional impairments are possible. Finally, springs can corrode, so that, for example, additional forces must be overcome when they are actuated. The invention as a whole seeks to remedy this.

SUMMARY OF DISCLOSURE

The invention is based on the technical problem of further developing such a motor vehicle lock and in particular a motor vehicle door lock so that overall, the opening movements of the locking mechanism are made available with reduced force, taking into account a simultaneously functionally reliable and cost-effective structure.

To solve this technical problem, the invention proposes a generic motor vehicle lock in which the rotary latch applies a closing moment on the pawl when the locking mechanism is in the closed state, which moment transitions into an opening moment on the pawl when the locking mechanism is opened as a result of the associated movement of the actuating lever and the shifting of the axis for the pawl.

In the context of the invention, therefore, a particularly functionally reliable operation is first made available, which at the same time is characterized by an opening moment during an opening process that is reduced compared to the prior art. When the locking mechanism is in the closed state, the rotary latch initially applies a closing moment on the pawl. In this way, any dynamic and unintentional opening of the pawl, for example when a motor vehicle is in motion, is almost impossible. This means that even if the rotary latch and pawl move against each other when the locking mechanism is closed, the closing moment exerted by the rotary latch on the pawl ensures that the rotary latch does not open unintentionally and that the pawl cannot release the rotary latch. This is a particularly relevant aspect in terms of safety.

At the same time and when opening the locking mechanism, according to the invention, the opening process is associated with a movement of the actuating lever in the opening direction. The opening movement of the actuating lever also means that the axis about which the pawl rotates relative to the actuating lever is also shifted in the opening direction. The shifting of the axis or axis of rotation of the pawl relative to the actuating lever in the described opening process results in the rotary latch applying an opening moment on the pawl when the locking mechanism is opened.

This opening moment during the opening movement of the locking mechanism supports the opening movement as a whole. This applies both when the motor vehicle lock in question is conventionally opened manually and when the opening process is carried out by a motor in the sense of "electrical opening." In principle, of course, both variants can also be implemented together. Either way, the opening moment exerted by the rotary latch on the pawl when the locking mechanism is opened ensures that the opening process is facilitated. In this way, for example, convenience is increased in the case of mechanical opening and motor power can be reduced in the case of an electrically opening lock.

In order to implement this in detail, the design is usually such that when the locking mechanism is in the closed state, the rotary latch applies a force on the pawl, which force is directed inwardly in relation to the axis of the actuating lever. The actuating lever is mounted in the lock case for rotation about the axis in question. Because the rotary latch exerts a force on the pawl when the locking mechanism is in the closed state, the direction of force or vector of which is directed inwardly, the desired closing moment is exerted on the pawl when the locking mechanism is in the closed state. This is because the inward direction of force in relation to the axis of the actuating lever ensures that the actuating lever and thus also the pawl mounted thereon are acted upon against the opening direction, i.e. in the closing direction. Accidental openings of the locking mechanism are effectively suppressed. In the closed position of the locking mechanism, the axis of the pawl rests in an undercut with respect to the direction of force, i.e. the direction of force is directed in such a way that force is applied on the pawl in the closing direction and thus creates a closing moment.

In contrast, when the locking mechanism is in the open state, the rotary latch applies a force on the pawl, which force is directed outwardly in relation to the axis of the actuating lever. As soon as the actuating lever is actuated manually or mechanically and/or by motor in the opening sense, this rotary movement about its axis defined in the lock case and the friction between the rotary latch and the pawl mean that the axis, with the aid of which the pawl is mounted on the actuating lever, is also shifted in the opening direction of the actuating lever. As a result of this shifting of the axis for the pawl, the vector of the force exerted by the rotary latch on the pawl also migrates over the axis supporting the actuating lever in the lock case and moves into the outward direction in relation to the axis of the actuating lever. At the same time, this is associated with the desired opening moment applied by the rotary latch on the pawl. The axis of the pawl is then in a pre-cut opposite the direction of force. The opening moment causes the rotary latch to push the pawl away so that the locking mechanism opens by itself.

In one embodiment of the invention, the actuating lever is equipped with a stop for limiting the angle of the rotational movement of the pawl relative to the actuating lever. This stop ensures that, with continued rotation of the actuating lever, the pawl is moved along and lifted off the rotary latch, even if the friction between the rotary latch and the pawl is too high for the opening moment to be sufficient to lift the pawl off the rotary latch. In this way, a high level of security against triggering the locking mechanism can be achieved, even in cases where, for example, the friction between the rotary latch and the pawl is increased due to the ingress of dirt. The angular movement of the rotational movement of the pawl relative to the actuating lever and its limitation is implemented in detail so that the pawl is fork-shaped with two fork arms on the stop side, i.e. in the direction of the stop on the actuating lever. The stop on the actuating lever now dips between the two fork arms. This automatically results in the desired angular limitation of rotational movement of the pawl relative to the actuating lever. Here it has proven useful if the rotational movement of the pawl relative to the actuating lever is limited to angles of up to a maximum of 80° and in particular up to 50°. Of course, this only applies as an example and depends on the actual topological conditions.

According to a further advantageous embodiment, a spring is also provided between the actuating lever and the pawl. The spring in question is usually mounted on the actuating lever and designed as a leg spring. One leg of the spring or leg spring is fixed on the actuating lever, while the other free leg and thus the spring as a whole generally biases the pawl in the direction of an elongated arrangement in relation to the actuating lever.

Usually, a further spring is provided. This spring ensures that the actuating lever is acted upon against its opening direction. In this way, the spring ensures that the actuating lever is not unintentionally acted upon in the opening direction by vibrations or other forces acting thereon when the vehicle is in motion, but rather, like the locking mechanism, maintains its basic position or home position associated with the closed position.

The result is a motor vehicle lock which is structurally simple and in particular dispenses with additional springs between the rotary latch and the pawl as in the prior art according to DE 102 14 691 B4. Rather, both the closed position of the locking mechanism and an opening process are implemented by means of a corresponding geometric and structural design of the locking mechanism. This results in cost advantages and improved functionality, also and especially over long time scales. Herein lie the essential advantages.

BRIEF DESCRIPTION OF DRAWINGS

The invention is explained in more detail below with reference to drawings which illustrate a preferred embodiment. In the drawings.

DETAILED DESCRIPTION

Figure 1:
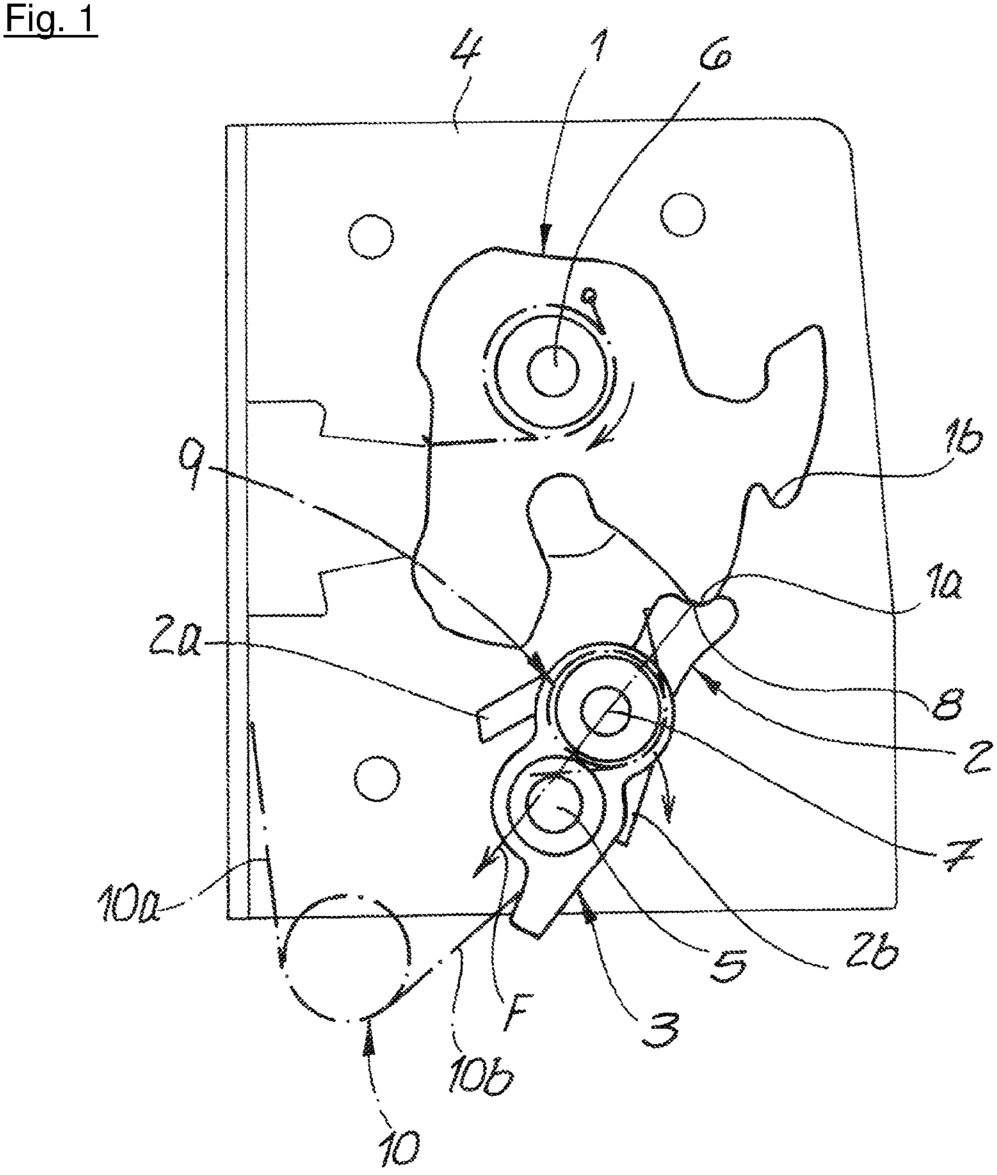
FIG. 1 shows a first variant of the motor vehicle lock according to the invention in the closed state or with the locking mechanism in the closed state.

The figures illustrate a motor vehicle lock, which is not limited to a motor vehicle door lock, i.e. a lock which is typically mounted in or on a motor vehicle door (not shown). The basic structure of the motor vehicle lock has a locking mechanism consisting of a rotary latch 1 and a pawl 2. In alternative configurations, the locking mechanism can also comprise a plurality of pawls 2 and, for example, be designed as a two-pawl locking mechanism, or even comprise a plurality of rotary latches. The basic structure then also includes an actuating lever 3. In order to open the locking mechanism, the actuating lever 3 is operated manually and/or by motor, which is indicated by an arrow P in FIG. 2 and corresponds to an application of force on the actuating lever 3 in the direction of the arrow P.

The actuating lever 3 is mounted in a lock case 4 for rotation. A bolt, which defines an axis 5 for the actuating lever 3, is anchored in the lock case 4. To distinguish it from the other axes to be described in more detail below, the axis 5 of the actuating lever 3 is referred to below as the actuating lever axis 5 relative to the lock case 4.

The rotary latch 1 is also mounted in the lock case 4, in which case a rotary latch axis 6 is defined in a manner comparable to that of the actuating lever 3. The pawl 2 is mounted on the actuating lever 3. Another axis 7, the pawl axis 7, is defined. According to the embodiment, the pawl 2 is arranged below the actuating lever 3 in a plan view of the motor vehicle lock, but it can also be arranged above the actuating lever 3. In principle, mixed forms are also conceivable.

In FIG. 1, the locking mechanism is shown in the closed state. Here, the pawl 2 interacts with a main ratchet 1*a* of the rotary latch 1, which main ratchet can be seen in addition to a pre-ratchet 1*b* which is also provided. In contrast to the usual locking mechanisms, the pawl 2 rests on the inside of the rotary latch 1 instead of on the outside. Since the rotary latch 1 is biased in the opening direction in relation to its rotary latch axis 6 with the aid of a spring, which corresponds to a clockwise movement of the rotary latch 1 about its rotary latch axis 6, as indicated in FIG. 1, the rotary latch 1 exerts a force F on the pawl 2 when the locking mechanism is in the closed state. This force F is applied on a contact surface of the rotary latch/pawl 8 on the pawl 2. The force F remains largely the same in terms of magnitude (i.e. with regard to the respective length of the arrow) in the other functional positions to be addressed later, but changes its direction, as can be seen when comparing the force F shown in the figures. As a result of the frictional forces between the pawl 2 and the rotary latch 1, the force F in question originates largely from the contact surface of the rotary latch/pawl 8.

When the locking mechanism is in the closed state, the rotary latch 1 applies a closing moment on the pawl 2. This closing moment results from the fact that the force F in question that is exerted by the rotary latch 1 on the pawl 2 and applied on the contact surface of the rotary latch/pawl 8 on the pawl 2 is directed inwardly in relation to the actuating lever axis 5. This means that starting from the contact surface of the rotary latch/pawl 8, the direction of force F when the locking mechanism is in the closed state is directed in the direction of a closing movement of the pawl 2 about its pawl axis 7, i.e. inwardly. In the same way, force F is also applied on the actuating lever 3 in relation to its actuating lever axis 5 against its opening direction.

However, if the locking mechanism is opened manually/by motor and the actuating lever 3 is acted upon in the direction of the arrow P, as has already been described, then the actuating lever 3 is pivoted slightly clockwise about its actuating lever axis 5 starting from its basic position according to FIG. 1 through such an opening process. This clockwise pivoting movement of the actuating lever 3 results in the pawl axis 7 also being pivoted clockwise. Since at the same time the pawl 2 remains on the main ratchet 1*a* of the rotary latch 1 during this process as a result of the friction existing between the rotary latch 1 and the pawl 2, this leads to a pivoting movement of the pawl 2 relative to the actuating lever 3, in a counterclockwise direction with respect to the pawl axis 7.

Figure 2:
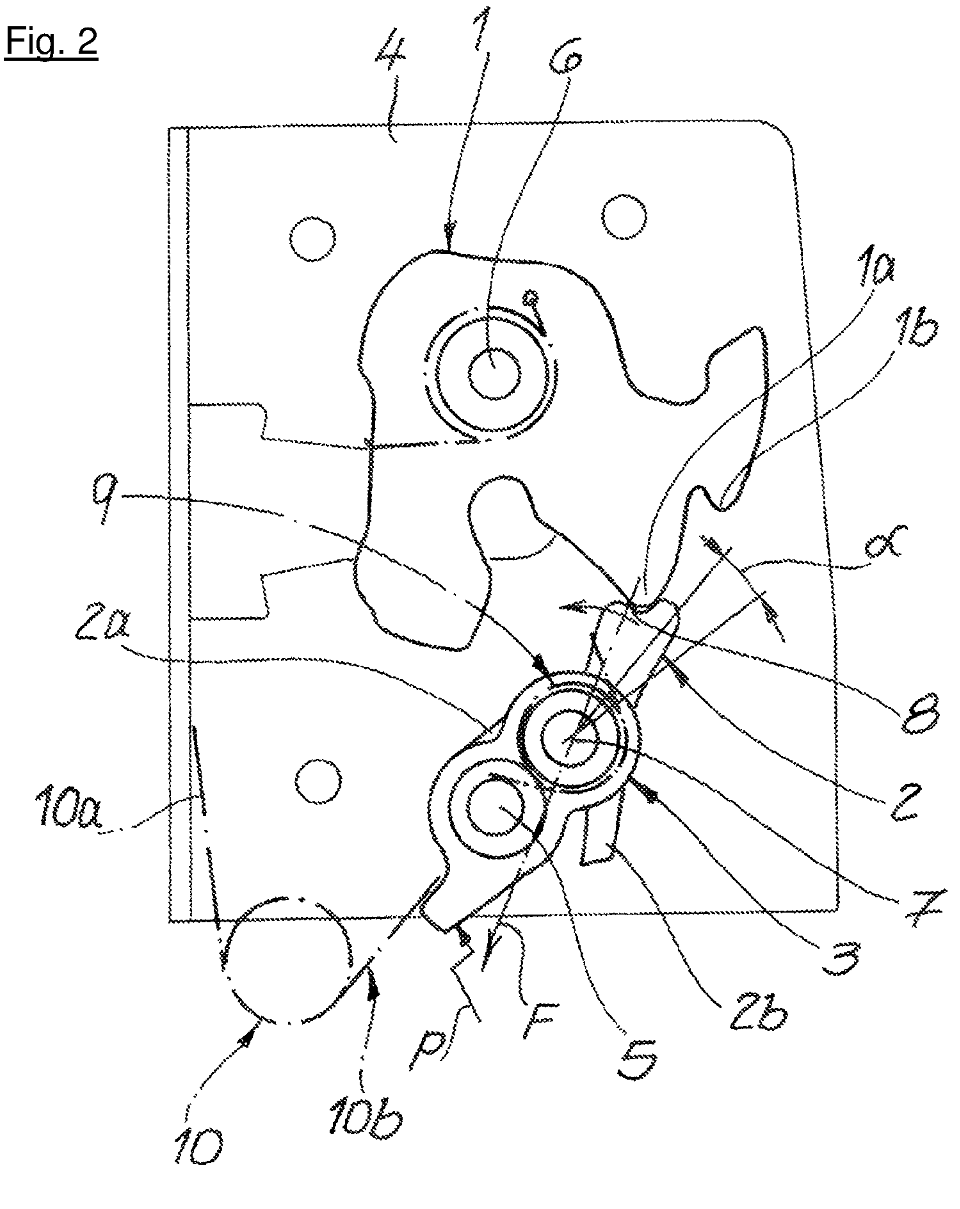
FIG. 2 shows an opening process of the locking mechanism.

While the actuating lever 3 and the pawl 2 mounted thereon have a rectified or collinear arrangement when the locking mechanism is in the closed position as shown in FIG. 1, in such a way that the pawl 2 is practically oriented as an extension of the actuating lever 3, in the opening process described, the actuating lever 3 and the pawl 2 enclose an angle $\alpha$ indicated in FIG. 2 between them. In the context of the invention, the design is such that the rotational movement of the pawl 2 relative to the actuating lever 3 is limited to angles $\alpha$ of up to a maximum of 75°. In order to implement this angle limitation in detail, the pawl 2 is equipped with two fork arms 2*a*, 2*b* on the stop side, i.e. in the direction of a stop not expressly shown and provided on the underside of the actuating lever 3.

The stop protruding from the actuating lever 3 on the underside dips between the two fork arms 2*a*, 2*b* of the pawl 2. As a result, on the one hand, the rotary movement of the pawl 2 relative to the actuating lever 3 is limited, taking into account the angle $\alpha$. On the other hand, the design ensures that the pawl 2 is held in the closed state of the locking mechanism 1, 2 as an extension of the actuating lever 3, as shown in FIG. 1. This is because the fork arm 2*b* on the right in the illustration strikes the stop on the underside of the actuating lever 3. If, on the other hand, the opening process occurs in accordance with the functional position in FIG. 2, the left fork arm 2*a* of the pawl 2 interacts with said stop and limits the rotary movement 2 to the angle $\alpha$ described.

Figure 4A:
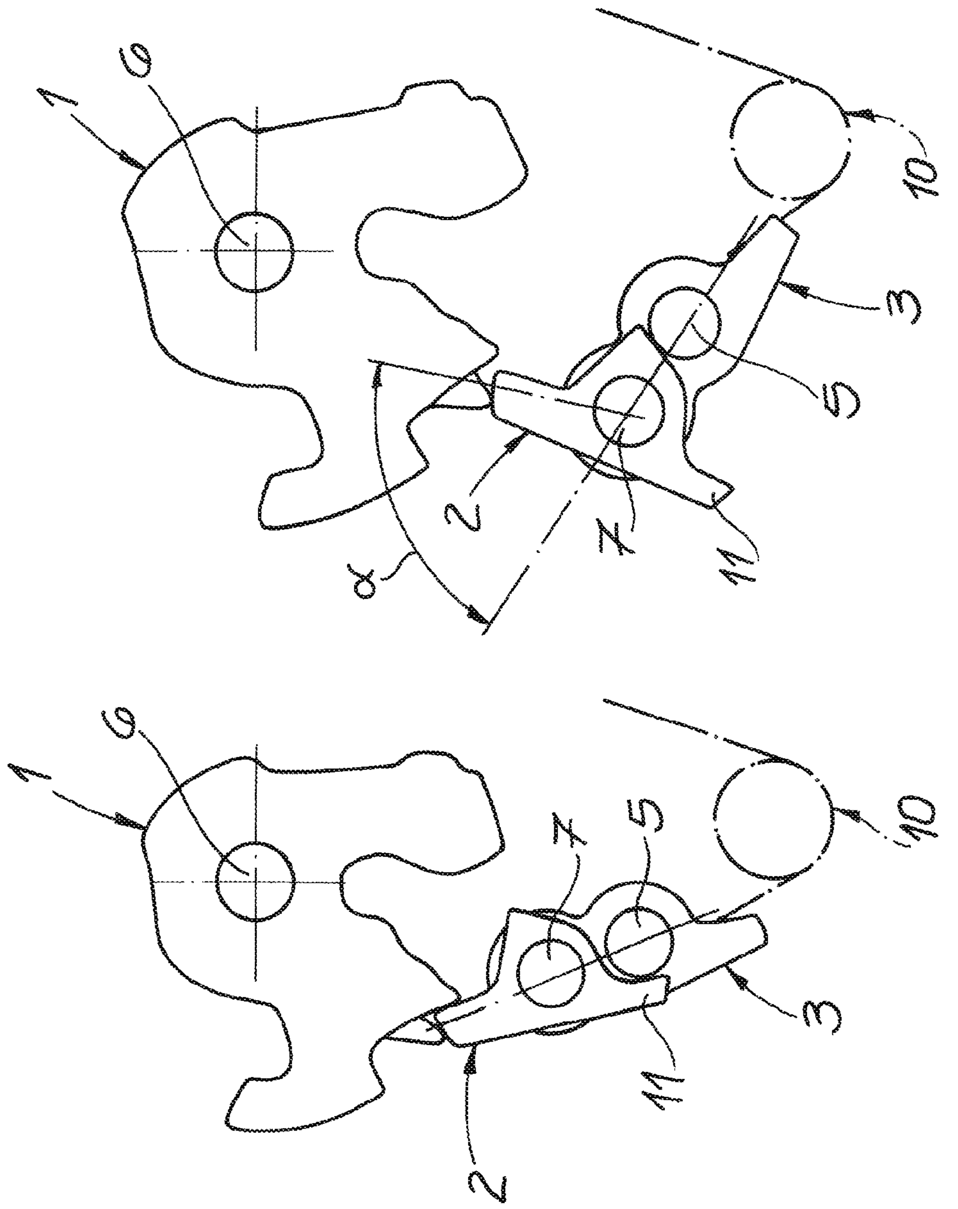
FIG. 4A-C show further variants of the motor vehicle lock according to the invention.
Figure 4B:
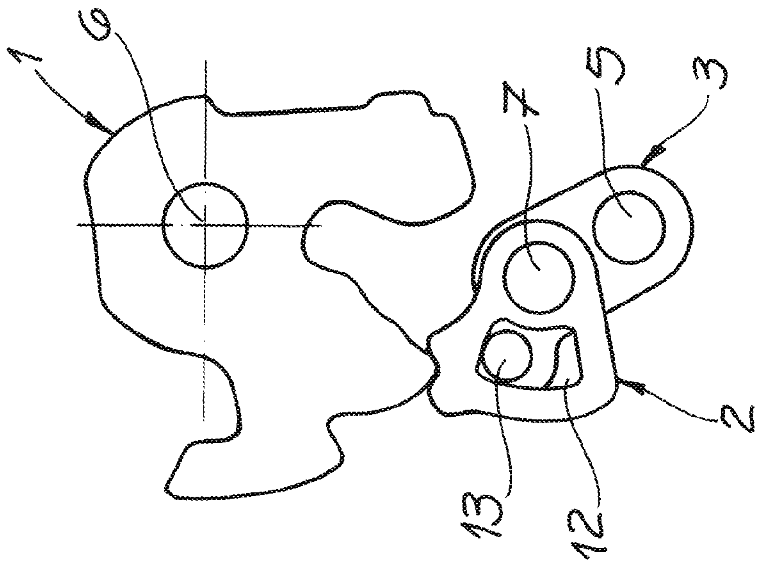
Figure 4B:
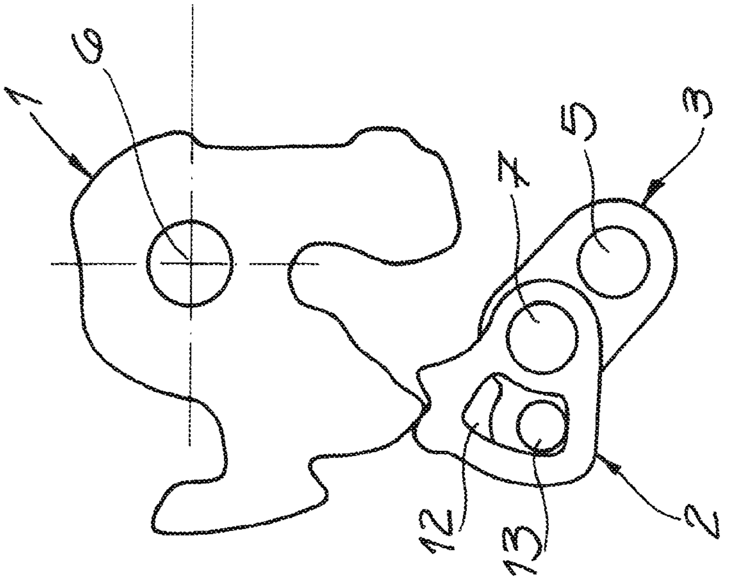
Figure 4C:
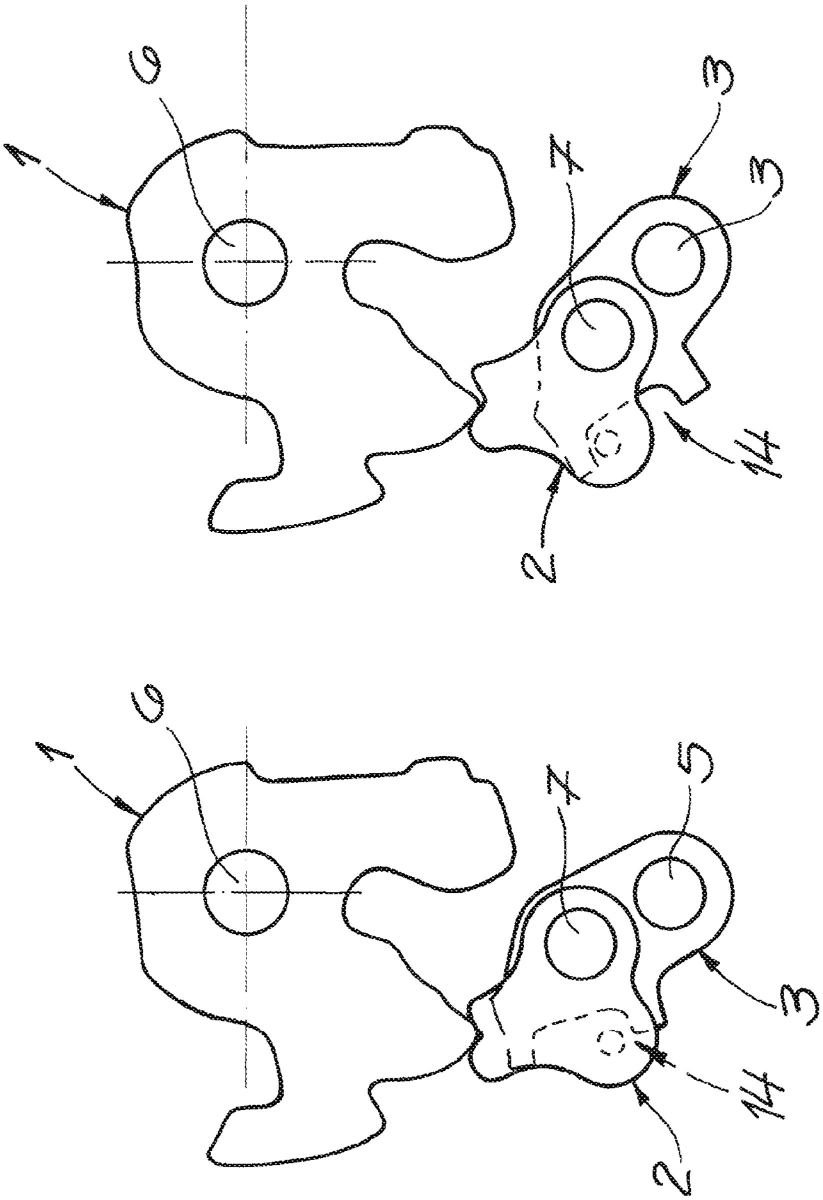

FIG. 4A to 4C show further variants of the motor vehicle lock according to the invention, in which the locking mechanism has alternative means for limiting the rotational movement of the pawl 2 relative to the actuating lever 3. Comparable limitations of the angle of rotation or angle $\alpha$ are achieved as before, although an express drawing in FIG. 4A to 4C has been dispensed with for reasons of clarity. The only exception here is the embodiment according to FIG. 4A, which at this point shows angles $\alpha$ up to almost 90°, i.e. the additional embodiments according to FIG. 4A to 4C make it clear that the rotational movement of the pawl 2 relative to the actuating lever 3 is limited to angles $\alpha$ of up to a maximum of 90°.

In fact, it can be seen in FIG. 4A that the pawl 2 has an L-shape or has an L-projection 11 for this purpose. This L-projection 11 interacts with the previously described stop protruding from the actuating lever 3 in order to limit the rotational movement of the pawl 2 relative to the actuating lever 3. This can be seen from the different functional positions in FIG. 4A.

In the variant according to FIG. 4B, on the other hand, the pawl 2 has an annular shape. An annular recess 12 is implemented in this context, into which a pin 13 dips and ensures the desired limitation of rotational movement of the pawl 2 relative to the actuating lever 3. The pin 13 is the previously mentioned stop protruding from the actuating lever 3.

The variant according to FIG. 4C finally works in such a way that the actuating lever 3 is equipped with a fork contour 14. The fork contour 14 in turn now interacts with a stop protruding from the pawl 2. This again results in the desired limitation of rotational movement of the pawl 2 relative to the actuating lever 3.

As a result of the open state of the locking mechanism already described and shown in FIG. 2, the rotary latch 1 continues to apply force F on the pawl 2. The shifting of the pawl axis 7 and the associated angular arrangement of the pawl 2 relative to the actuating lever 3 now means, however, that the force F exerted by the rotary latch 1 on the pawl 2 in relation to the axis 5 of the actuating lever 3 or the actuating lever axis 5 is directed outwardly. This means that the force F, with its direction now being applied on the pawl 2, ensures that the pawl 2 is opened by the outward orientation of the force F. The same applies to the actuating lever 3. This means that the opening process is supported, as already described in the introduction.

Figure 3:
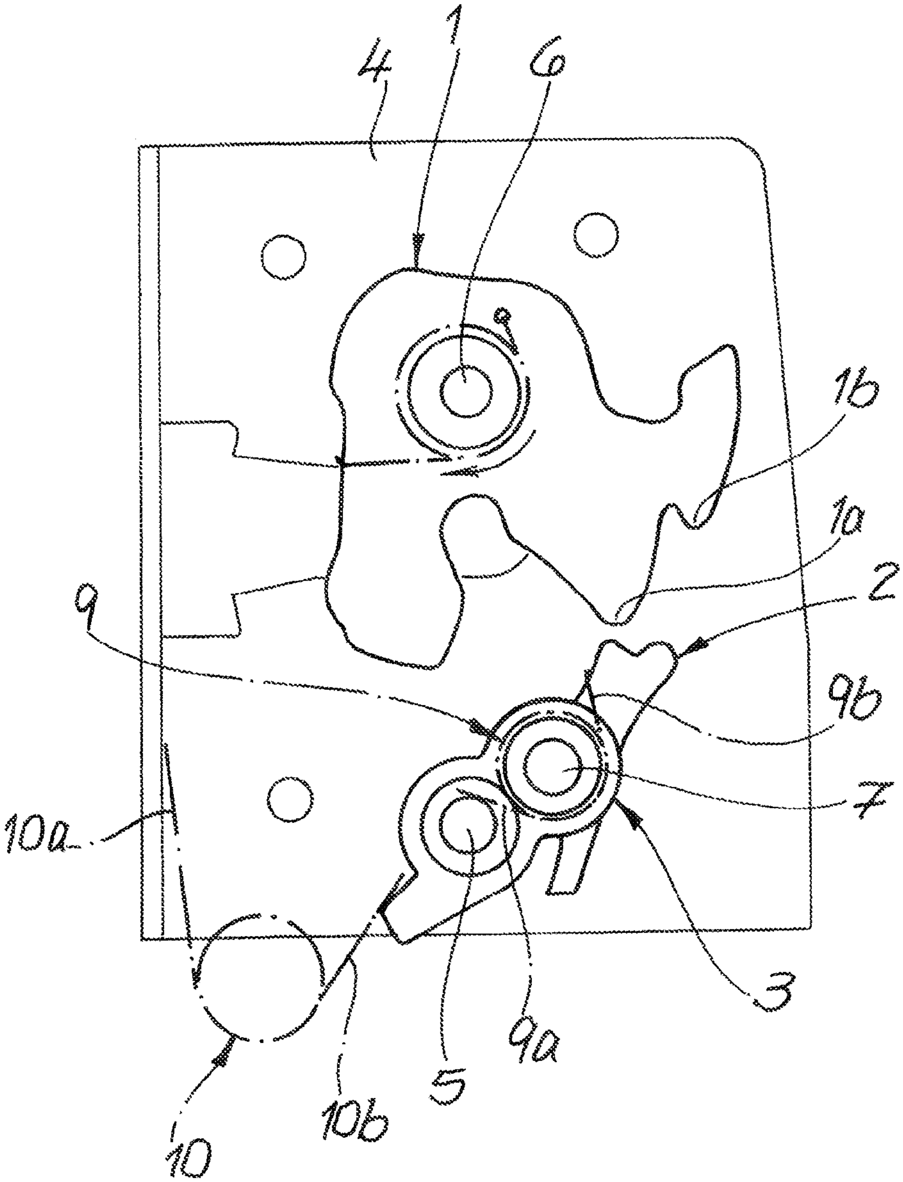
FIG. 3 shows the locking mechanism in the fully open position.

As a result of the opening moment exerted by the rotary latch 1 on the pawl 2 during the opening process, the pawl 2 finally releases the rotary latch 1 during the transition from FIG. 2 to FIG. 3, which rotary latch then, supported by its spring, pivots open about the rotary latch axis 6 in the indicated clockwise direction and releases a previously caught and not expressly shown locking bolt. As a result, the associated motor vehicle door can be opened. In this case, the opening forces used are lower overall than before, because the rotary latch 1 exerts the described opening moment on the pawl 2 when the locking mechanism is in the open state.

Finally, a spring 9 can also be seen in the figures, which spring is provided between the actuating lever 3 and the pawl 2. According to the embodiment, the spring 9 is equipped as a leg spring with two leg arms 9*a*, 9*b*. The spring or leg spring 9 is mounted on the actuating lever 3. One leg arm 9*a* is fixed to the actuating lever 3, while the other free leg arm 9*b* and thus the spring 9 as a whole biases the pawl 2 in the direction of an elongated arrangement in relation to the actuating lever 3. This elongated arrangement is shown in FIG. 1 and, according to the embodiment, corresponds to the fact that the right fork arm 2*b* of the pawl 2 rests against the stop of the actuating lever 3.

In addition to the spring 9 already described, a further spring 10 mounted in the lock case 4 is also implemented. The spring 10 is also a leg spring. One leg 10*a* of the spring 10 is fixed in or on the lock case 4. In contrast, the free leg 10*b* of the spring 10 acts on the release lever 3, specifically against its opening direction, i.e. with a force which acts opposite to the direction of the arrow P of the manual and/or motorized actuation. In this way, the actuating lever 3 is held in its basic position according to FIG. 1 and can only be acted upon manually and/or by motor in the direction of arrow P against the force of the spring 10.

| List of reference signs | |
|---|---|
| 1 | Rotary latch |
| 1a | Main ratchet |
| 1b | Pre-ratchet |
| 2 | Pawl |
| 2a | Left fork arm |
| 2b | Right fork arm |
| 3 | Actuating lever |
| 4 | Lock case |
| 5 | Axis/Actuating lever axis |
| 6 | Rotary latch axis |
| 7 | Axis/Pawl axis |
| 8 | Contact surface of the rotary latch/pawl |
| 9 | Spring/Leg spring |
| 9a | Leg arm |
| 9b | Free leg arm |
| 10 | Spring/Leg spring |
| 10a | Leg |
| 10b | Free leg |
| 11 | L-projection |
| 12 | Annular recess |
| 13 | Pin |
| 14 | Fork contour |
| F | Force |
| P | Arrow/Arrow direction |
| α | Angle |

The invention claimed is:

1. A motor vehicle lock for a motor vehicle door, the motor vehicle lock comprising:

a lock case;

a locking mechanism including a rotary latch and a pawl, wherein the rotary latch is mounted to the lock case via a rotary latch axis for rotation relative to the lock case about the rotary latch axis;

an actuating lever mounted to the lock case via an actuating lever axis for rotation relative to the lock case about the actuating lever axis, wherein the pawl is mounted on the actuating lever via a pawl axis for rotation relative to the actuating lever about the pawl axis, wherein in a closed state, the rotary latch exerts a force against the pawl at a contact surface of the rotary latch and the pawl and that is directed inward in relation to the actuating lever axis, and due to the force, the rotary latch applies a closing moment on the pawl when the locking mechanism is in the closed state, the closing moment also being directed inward in relation to the actuating lever axis; and wherein during an opening operation, the pawl axis shifts relative to the actuating lever axis upon rotation of the actuating lever, thereby the closing moment transitions into an opening moment on the pawl when the locking mechanism is opening toward an open state as a result of the rotation of the actuating lever and the shifting of the pawl axis, such that the force applied by the rotary latch against the pawl is directly outwardly in relation to the actuating lever axis, whereby the opening moment urges the pawl toward the open state.

2. The motor vehicle lock according to claim 1, wherein the actuating lever is equipped with a stop for limiting an angle of rotation of the pawl relative to the actuating lever.

3. The motor vehicle lock according to claim 2, wherein the pawl is fork-shaped on a stop side with two fork arms, wherein the stop on the actuating lever dips between the two fork arms.

4. The motor vehicle lock according to claim 2, wherein the rotation of the pawl relative to the actuating lever is limited to angles of up to a maximum of 80°.

5. The motor vehicle lock according to claim 1, wherein a spring is provided between the actuating lever and the pawl.

6. The motor vehicle lock according to claim 5, wherein the spring biases the pawl in a direction of an elongated arrangement in relation to the actuating lever.

7. The motor vehicle lock according to claim 1 further comprising a spring which acts on the actuating lever against an opening direction of the actuating lever.

8. The motor vehicle lock according to claim 1, wherein the rotation of the actuating lever during the opening operation is caused manually and/or by a motor.

9. The motor vehicle lock according to claim 4, wherein the rotation of the pawl relative to the actuating lever is limited to angles of up to a maximum of 50°.

10. The motor vehicle lock according to claim 1, wherein the actuating lever rigidly connects the actuating lever axis and the pawl lever axis.

11. The motor vehicle lock according to claim 1, wherein at least a portion of the actuating lever encircles the pawl lever axis to rigidly connect the actuating lever axis and the pawl lever axis, whereby the rotation of the actuating lever during the opening operation imparts the shifting of the pawl lever axis.

12. The motor vehicle lock according to claim 1, wherein in the closed state, the actuating lever and the pawl are collinear, and during the opening operation, the pawl is rotated to be oriented at an angle relative to the actuating lever.

* * * * *